US012633132B2

(12) United States Patent
Fujiki et al.

(10) Patent No.: US 12,633,132 B2
(45) Date of Patent: May 19, 2026

(54) APPARATUS AND METHOD FOR OBJECT DETECTION

(71) Applicant: TOYOTA JIDOSHA KABUSHIKI KAISHA, Toyota (JP)

(72) Inventors: Takuya Fujiki, Edogawa-ku (JP); Ryusuke Kuroda, Edogawa-ku (JP); Tadashi Okubo, Machida (JP); Kenichiro Aoki, Machida (JP); Tetsuro Sugiura, Chofu (JP); Wataru Kawashima, Nisshin (JP); Hitoshi Kamada, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 320 days.

(21) Appl. No.: 18/447,587

(22) Filed: Aug. 10, 2023

(65) Prior Publication Data

US 2024/0071097 A1     Feb. 29, 2024

(30) Foreign Application Priority Data

Aug. 23, 2022     (JP) ................................. 2022-132540

(51) Int. Cl.
*G06V 20/58*          (2022.01)
*G06V 20/56*          (2022.01)
*G08G 1/052*          (2006.01)

(52) U.S. Cl.
CPC ............ *G06V 20/58* (2022.01); *G06V 20/588* (2022.01); *G08G 1/052* (2013.01)

(58) Field of Classification Search
CPC ...... G06V 20/58; G06V 20/588; G06V 10/82; G06V 20/56; G08G 1/052; G08G 1/16; G06N 3/0464; G06N 3/084
See application file for complete search history.

(56) References Cited

U.S. PATENT DOCUMENTS

| | | | |
|---|---|---|---|
| 10,173,586 B1 * | 1/2019 | Kashchenko ........... | G06F 3/017 |
| 2011/0222732 A1 * | 9/2011 | Higuchi ................. | G08G 1/167 |
| | | | 382/104 |
| 2015/0149076 A1 * | 5/2015 | Strauss .................. | G01C 21/34 |
| | | | 701/410 |

(Continued)

FOREIGN PATENT DOCUMENTS

| | | | | |
|---|---|---|---|---|
| CN | 111738207 A | * 10/2020 | ........... | G06F 18/213 |
| JP | 2019032721 A | 2/2019 | | |

(Continued)

*Primary Examiner* — Solomon G Bezuayehu
(74) *Attorney, Agent, or Firm* — Dickinson Wright, PLLC

(57) ABSTRACT

An apparatus for object detection detects a number of lanes included in a road on which a vehicle is traveling, detects one or more surrounding vehicles positioned in surroundings of the vehicle from a surrounding image showing the surroundings of the vehicle generated by a camera mounted in the vehicle, and determines, when more surrounding vehicles than the number of lanes detected in a predetermined range at the back of the vehicle are detected alongside in a width direction of the vehicle, that a possibility that any one of the surrounding vehicles being an emergency vehicle which is allowed to travel without obeying the traveling rule of the road is higher than when more surrounding vehicles than the number of lanes are not detected alongside in a width direction of the vehicle.

7 Claims, 6 Drawing Sheets

(56)　　　　　References Cited

U.S. PATENT DOCUMENTS

| | | | |
|---|---|---|---|
| 2015/0154861 A1* | 6/2015 | Hillenbrand | G08G 1/0145 |
| | | | 701/2 |
| 2015/0161458 A1* | 6/2015 | Agnew | G06V 20/584 |
| | | | 382/104 |
| 2015/0166062 A1* | 6/2015 | Johnson | G08G 1/167 |
| | | | 701/41 |
| 2015/0175204 A1* | 6/2015 | Oh | G08G 1/167 |
| | | | 701/300 |
| 2017/0061222 A1* | 3/2017 | Hoye | G07C 5/0891 |
| 2017/0293813 A1* | 10/2017 | Belhoula | G06V 20/588 |
| 2018/0319325 A1* | 11/2018 | Tatara | B60Q 1/2696 |
| 2019/0035269 A1* | 1/2019 | Donovan | G05D 1/0293 |
| 2019/0088126 A1* | 3/2019 | Banvait | G08G 1/096791 |
| 2020/0094826 A1 | 3/2020 | Abe et al. | |
| 2020/0198626 A1 | 6/2020 | Yanagi et al. | |
| 2021/0201676 A1* | 7/2021 | Tariq | G08G 1/096725 |
| 2023/0365064 A1* | 11/2023 | Suzuki | G09G 5/00 |

FOREIGN PATENT DOCUMENTS

| | | | |
|---|---|---|---|
| JP | 2020050109 A | 4/2020 | |
| JP | 2020102034 A | 7/2020 | |

* cited by examiner

FIG. 7

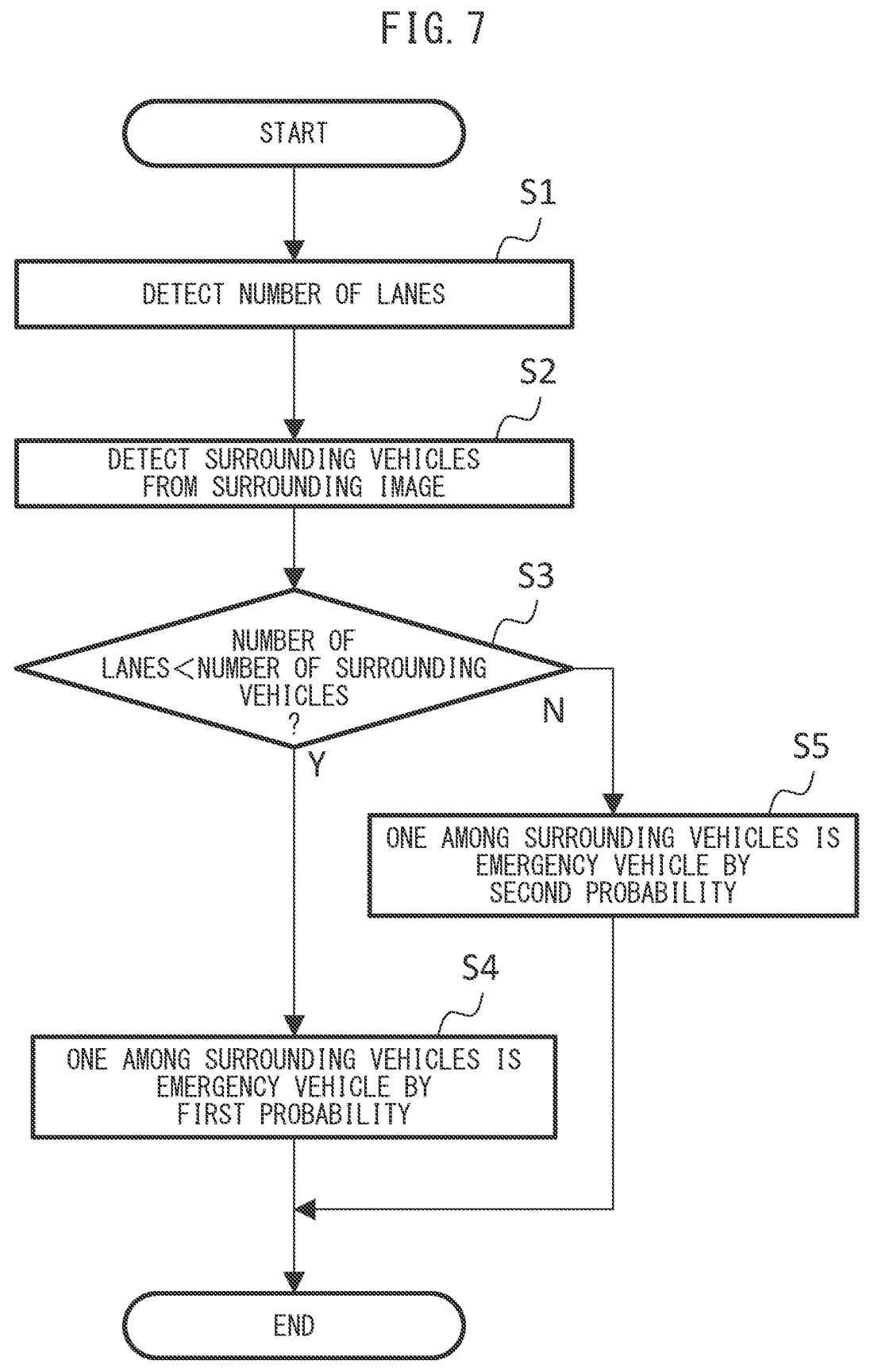

```
        ┌─────────────────────┐
        │        START        │
        └──────────┬──────────┘
                   │                    S1
        ┌──────────▼──────────┐
        │ DETECT NUMBER OF LANES │
        └──────────┬──────────┘
                   │                    S2
        ┌──────────▼──────────────┐
        │ DETECT SURROUNDING VEHICLES │
        │   FROM SURROUNDING IMAGE    │
        └──────────┬──────────────┘
                   │                    S3
              ◇────▼──────◇
         NUMBER OF
    LANES<NUMBER OF SURROUNDING
              VEHICLES
                 ?              N
              Y                         S5
                         ┌──────────────────────────────┐
                         │ ONE AMONG SURROUNDING VEHICLES IS │
                         │      EMERGENCY VEHICLE BY         │
                         │      SECOND PROBABILITY           │
                         └──────────────┬────────────────┘
                   │  S4
        ┌──────────▼──────────────┐
        │ ONE AMONG SURROUNDING VEHICLES IS │
        │      EMERGENCY VEHICLE BY         │
        │      FIRST PROBABILITY            │
        └──────────┬──────────────┘
                   │
        ┌──────────▼──────────┐
        │        END          │
        └─────────────────────┘
```

APPARATUS AND METHOD FOR OBJECT DETECTION

FIELD

The present disclosure relates to an apparatus and method for object detection for detecting an object from an image.

BACKGROUND

A vehicle other than emergency vehicles engaged in a high-priority work (for example, an ambulance, a fire truck, a police car, etc.) is required, when approached by an emergency vehicle, to take a certain action such as evacuating to a road shoulder to avoid blocking the path of the emergency vehicle.

Japanese Unexamined Patent Publication No. 2019-032721 (hereinafter "PTL 1") describes a driver assistance server which assists driving of an emergency vehicle and general vehicles other than emergency vehicles. The driver assistance server described in PTL 1 identifies a blocking vehicle which might block the path of the emergency vehicle from the travel routes of the emergency vehicle and general vehicles. Further, the driver assistance server described in PTL 1 determines an evacuation control method of the blocking vehicle based on lane change information stored in the map database.

SUMMARY

Some of the general vehicles cannot communicate with the driver assistance server described in PTL 1. It is desired for such general vehicles to autonomously detect an emergency vehicle and take a certain action with respect to the approach of the emergency vehicle.

It is an object of the present disclosure to provide an apparatus for object detection that appropriately detects an emergency vehicle.

An apparatus for object detection according to the present disclosure includes a processor configured to detect a number of lanes included in a road on which a vehicle is traveling. The processor of the apparatus further detects one or more surrounding vehicles positioned in surroundings of the vehicle from a surrounding image representing the surroundings of the vehicle generated by a camera mounted in the vehicle. The processor of the apparatus further determines, when more surrounding vehicles than the number of lanes detected in a predetermined range at the back of the vehicle are detected alongside in a width direction of the vehicle, that a possibility that any one of the surrounding vehicles being an emergency vehicle which is allowed to travel without obeying the traveling rule of the road is higher than when more surrounding vehicles than the number of lanes are not detected alongside in a width direction of the vehicle.

In the apparatus according to the present disclosure, the processor in determination preferably determines that the possibility that a surrounding vehicle among the surrounding vehicles being an emergency vehicle is higher as the faster its speed.

In the apparatus according to the present disclosure, the processor in determination preferably determines that the possibility that a surrounding vehicle among the surrounding vehicles being an emergency vehicle is higher with no other surrounding vehicle detected in front or back thereof than the possibility of a surrounding vehicle with other surrounding vehicles detected in front or back thereof.

In the apparatus according to the present disclosure, the processor in determination preferably determines that the possibility that a surrounding vehicle among the surrounding vehicles being an emergency vehicle is lower when an aspect ratio showing a ratio of a length in a left-right direction to a length in an up-down direction in a region corresponding to a surrounding vehicle in the surrounding image is smaller than a predetermined aspect ratio threshold value than when the aspect ratio is larger than the aspect ratio threshold value.

In the apparatus according to the present disclosure, the processor in determination preferably determines that the possibility that a surrounding vehicle among the surrounding vehicles being an emergency vehicle is higher when an emergency sound that an emergency vehicle emits while traveling is detected from sound information in the surroundings of the vehicle than when the emergency sound is not detected from the sound information.

A method for object detection according to the present disclosure includes detecting a number of lanes included in a road on which a vehicle is traveling, detecting one or more surrounding vehicles positioned in surroundings of the vehicle from a surrounding image representing the surroundings of the vehicle generated by a camera mounted in the vehicle, and determining, when more surrounding vehicles than the number of lanes detected in a predetermined range at the back of the vehicle are detected alongside in a width direction of the vehicle, that a possibility that any one of the surrounding vehicles being an emergency vehicle which is allowed to travel without obeying the traveling rule of the road is higher than when more surrounding vehicles than the number of lanes are not detected alongside in a width direction of the vehicle.

A computer program for object detection stored in a non-transitory computer readable medium according to the present disclosure causes a computer mounted in a vehicle to execute a process including detecting a number of lanes included in a road on which the vehicle is traveling, detecting one or more surrounding vehicles positioned in surroundings of the vehicle from a surrounding image representing the surroundings of the vehicle generated by a camera mounted in the vehicle, and determining, when more surrounding vehicles than the number of lanes detected in a predetermined range at the back of the vehicle are detected alongside in a width direction of the vehicle, that a possibility that any one of the surrounding vehicles is an emergency vehicle which is allowed to travel without obeying the traveling rule of the road is higher than when more surrounding vehicles than the number of lanes are not detected alongside in a width direction of the vehicle.

The apparatus according to the present disclosure appropriately detect an emergency vehicle.

BRIEF DESCRIPTION OF DRAWINGS

FIG. 7 is a flowchart of a process for object detection.

DESCRIPTION OF EMBODIMENTS

An apparatus for object detection that can appropriately detect an emergency vehicle will now be described in detail with reference to the attached drawings. The apparatus detects a number of lanes included in a road which a vehicle is traveling on. Further, the apparatus detects one or more surrounding vehicles positioned in surroundings of the vehicle from a surrounding image representing the surroundings of the vehicle generated by a camera mounted in the vehicle. Further, the apparatus determines, when more surrounding vehicles than the number of lanes detected in a predetermined range at the back of the vehicle are detected alongside in a width direction of the vehicle, that a possibility that any one of the surrounding vehicles being an emergency vehicle is higher than when more surrounding vehicles than the number of lanes are not detected alongside in a width direction of the vehicle. An emergency vehicle is a vehicle which is allowed to travel without obeying the traveling rule of the road. When the possibility of any one of the surrounding vehicles being an emergency vehicle is determined high, the controller of the vehicle may propose a predetermined action corresponding to the approach of an emergency vehicle (for example, change of autonomous driving level) to the driver.

Figure 1:
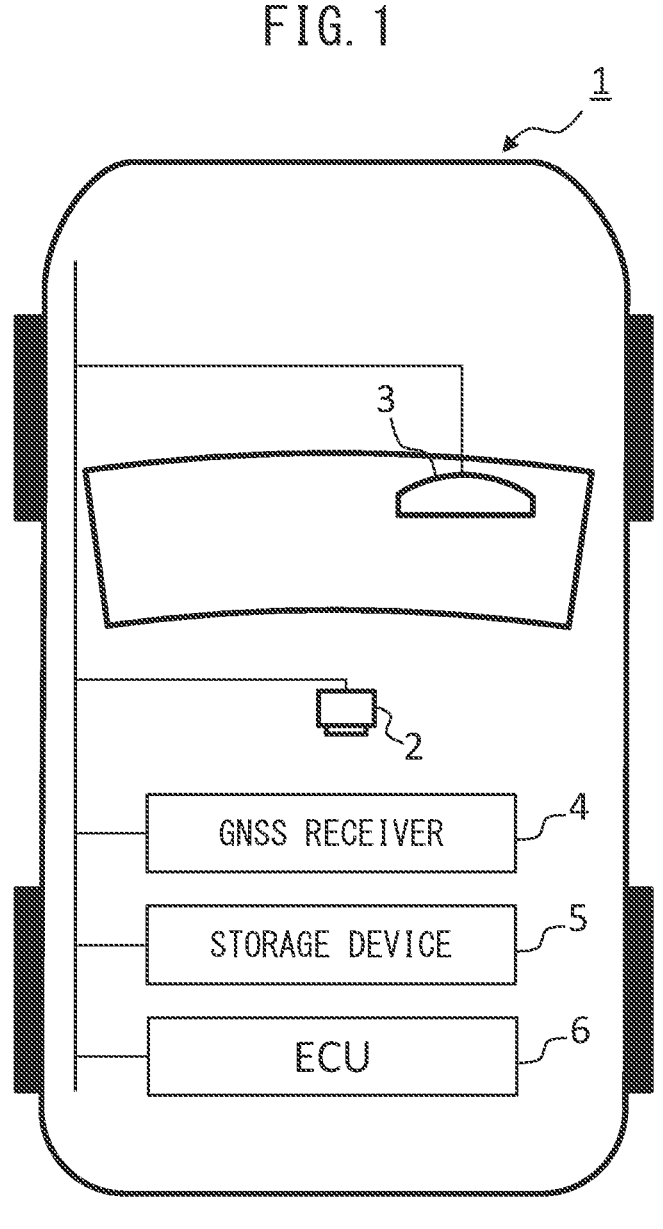
FIG. 1 schematically illustrates the configuration of a vehicle equipped with an apparatus for object detection.

FIG. 1 schematically illustrates the configuration of a vehicle equipped with an apparatus for object detection.

The vehicle 1 includes a surrounding camera 2, a meter display 3, a global navigation satellite system (GNSS) receiver 4, a storage device 5, and an electronic control unit (ECU) 6. The ECU 6 is an example of the apparatus for object detection. The surrounding camera 2, the meter display 3, the GNSS receiver 4, and the storage device 5 and the ECU 6 are connected via an in-vehicle network conforming to a standard, such as a controller area network, so that they can communicate with each other.

The surrounding camera 2 is an example of a surrounding sensor for generating surrounding data representing the situation around the vehicle 1. The surrounding camera 2 includes a two-dimensional detector constructed from an array of optoelectronic transducers, such as CCD or C-MOS, having sensitivity to visible light and a focusing optical system that forms an image of a target region on the two-dimensional detector. The surrounding camera 2 is disposed, for example, in a front and upper area in the interior of the vehicle and oriented forward. The surrounding camera 2 takes a picture of the surroundings of the vehicle 1 through a windshield every predetermined capturing period (e.g., 1/30 to 1/10 seconds) and outputs surrounding images in which the situation in the surroundings is shown as surrounding data.

The vehicle 1 may further have, as a surrounding sensor, a microphone (not shown) for outputting sound information representing sound around the vehicle 1.

The meter display 3 is an example of an output device and includes, for example, a liquid crystal display. The meter display 3 displays information relating to an emergency vehicle approaching the vehicle 1 in a visible way for the driver, in accordance with a signal received from the ECU 6 via the in-vehicle network.

The GNSS receiver 4 receives GNSS signals from GNSS satellites at predetermined intervals and determines the position of the vehicle 1 based on the received GNSS signals. The GNSS receiver 4 outputs a positioning signal indicating the result of determination of the position of the vehicle 1 based on the GNSS signals to the ECU 6 via the in-vehicle network predetermined intervals.

The storage device 5, which is an example of a storage unit, includes, for example, a hard disk drive or a nonvolatile semiconductor memory. The storage device 5 stores map data including information on terrestrial features, such as lane lines, in association with their positions.

The ECU 6 determines the possibility of a surrounding vehicle traveling in the surroundings of the vehicle 1, detected from a surrounding image generated by the surrounding camera 2, being an emergency vehicle. When a possibility of a surrounding vehicle among the surrounding vehicles being an emergency vehicle is determined high, the ECU 6 proposes the driver to take predetermined action corresponding to the approach of an emergency vehicle.

Figure 2:
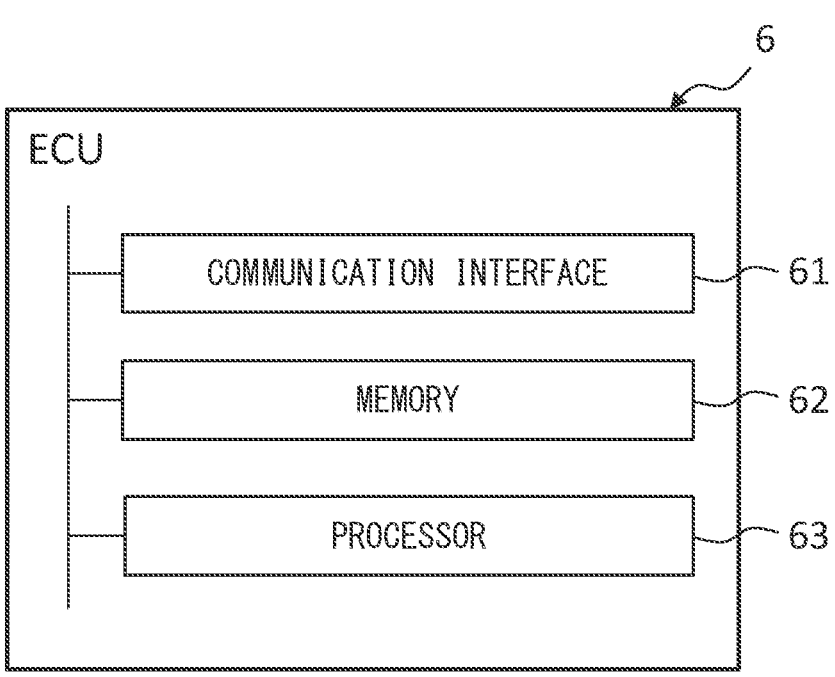
FIG. 2 schematically illustrates hardware of an ECU.

FIG. 2 schematically illustrates the hardware of the ECU 6. The ECU 6 includes a communication interface 61, a memory 62, and a processor 63.

The communication interface 61, which is an example of a communication unit, includes a communication interface circuit for connecting the ECU 6 to the in-vehicle network. The communication interface 61 provides received data for the processor 63, and outputs data provided from the processor 63 to an external device.

The memory 62 includes volatile and nonvolatile semiconductor memories. The memory 62 stores various types of data used for processing by the processor 63, such as groups of parameters of a neural network used as a classifier for detecting surrounding vehicles and lane lines from a surrounding image (number of layers, layer compositions, kernels, weighting coefficients, etc.). The memory 62 also stores an aspect ratio threshold value for determining the possibility of a surrounding vehicle being an emergency vehicle from the aspect ratio of the region corresponding to a surrounding vehicle in the surrounding image. The memory 62 also stores siren data representing features of the siren generated when an emergency vehicle is traveling. The memory 62 also stores various application programs, such as an object detection program to execute therefor.

The processor 63, which is an example of a control unit, includes one or more processors and a peripheral circuit thereof. The processor 63 may further include another operating circuit, such as a logic-arithmetic unit, an arithmetic unit, or a graphics processing unit.

Figure 3:
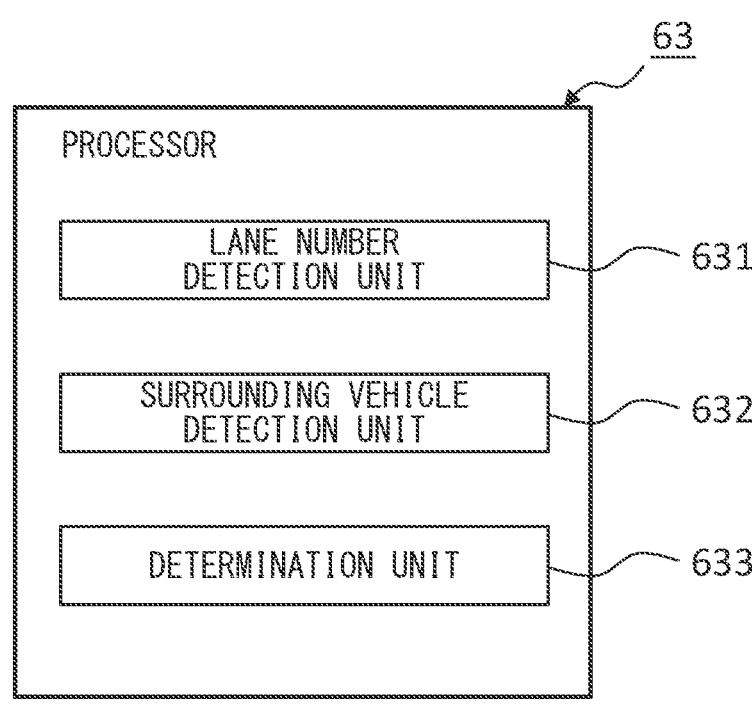
FIG. 3 is a functional block diagram of a processor included in the ECU.

FIG. 3 is a functional block diagram of the processor 63 included in the ECU 6.

As its functional blocks, the processor 63 of the ECU 6 includes a lane number detection unit 631, a surrounding vehicle detection unit 632, and a determination unit 633. These units included in the processor 63 are functional modules implemented by a computer program stored in the memory 62 and executed on the processor 63. The computer program for achieving the functions of the units of the processor 63 may be provided in a form recorded on a computer-readable and portable medium, such as a semi-conductor memory, a magnetic recording medium, or an optical recording medium. Alternatively, the units included in the processor 63 may be implemented in the ECU 6 as separate integrated circuits, microprocessors, or firmware.

The lane number detection unit 631 detects the number of lanes in a road on which the vehicle 1 is traveling.

The lane number detection unit 631 acquires, from the storage device 5 storing the map data, the lane information indicating the number of lanes in a road on which the vehicle 1 is traveling in the surroundings of the current position of the vehicle 1 identified by a positioning signal received from the GNSS receiver 4. The lane number detection unit 631 detects the number of lanes in a road on which the vehicle 1 is traveling based on the acquired lane information.

The lane number detection unit 631 may also detect the number of lanes in a road on which the vehicle 1 is traveling by inputting an image of the surroundings generated by the surrounding camera 2 into a classifier that has been trained in advance to detect lane lines. The lane number detection unit 631 can identify the number of lanes in the road by subtracting 1 from the number of lane lines in a direction perpendicular to the traveling direction of the vehicle 1.

The classifier may be, for example, a convolutional neural network (CNN) including a plurality of convolution layers connected in series from the input toward the output. A CNN that has been trained in accordance with a predetermined training technique, such as backpropagation, using a plurality of images including lane lines as training data operates as a classifier to detect lane lines from a surrounding image.

The surrounding vehicle detection unit 632 detects one or more surrounding vehicles positioned in the surroundings of the vehicle 1 from a surrounding image generated by the surrounding camera 2 mounted on the vehicle 1.

The surrounding vehicle detection unit 632 detects the surrounding vehicles and lane lines positioned in the surroundings of the vehicle 1 by inputting the surrounding image into a classifier that has been trained in advance to detect vehicles and lane lines. The classifier may be, for example, a CNN. A CNN that has been trained in accordance with a predetermined trained technique, such as backpropagation, using a plurality of images including vehicles and lane lines as training data operates as a classifier to detect vehicles and lane lines from a surrounding image. The lane number detection unit 631 may also detect lane lines by using the classifier used for detection of surrounding vehicles by the surrounding vehicle detection unit 632.

Figure 4A:
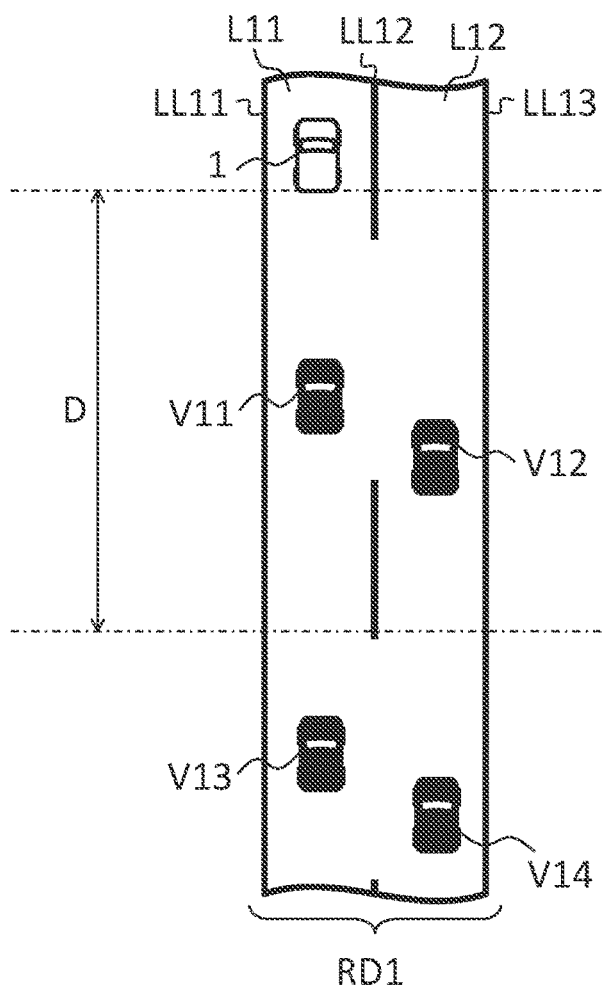
FIG. 4A schematically illustrates a first example of object detection.
Figure 4B:
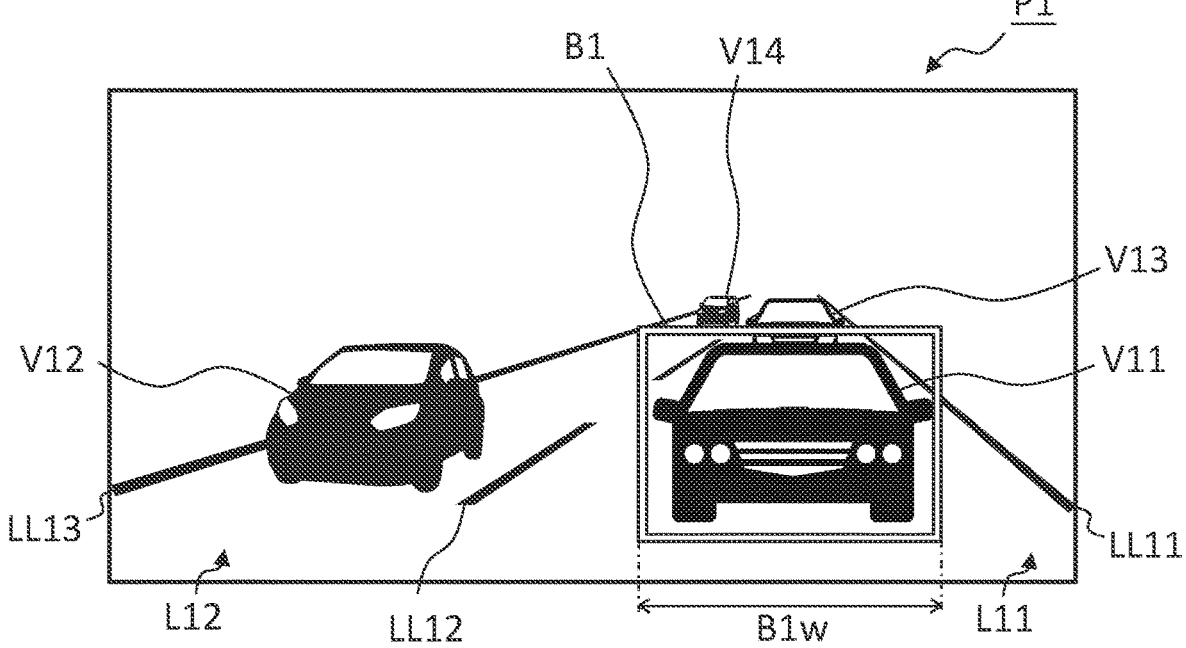
FIG. 4B is a surrounding image generated in accordance with the first example of object detection.

FIG. 4A schematically illustrates a first example of object detection, and FIG. 4B is a surrounding image generated in accordance with the first example of object detection.

In the first example of object detection, the lane number detection unit 631 detects, from the storage device 5 storing the map data, two lanes in the road R1 in the surroundings of the vehicle 1. The vehicle 1 is traveling on the lane L11 in the road R1 having the lane L11 demarcated by the lane lines LL11 and LL12, and the lane L12 demarcated by the lane lines LL12 and LL13. On the lane L11, behind the vehicle 1, in ascending order of distance from the vehicle 1, a surrounding vehicle V11 and a surrounding vehicle V13 are traveling. On the lane L12, behind the vehicle 1, in ascending order of distance from the vehicle 1, a surrounding vehicle V12 and a surrounding vehicle V14 are traveling.

In the first example of object detection, the surrounding camera 2 of the vehicle 1 generates a surrounding image P1 showing the state behind the vehicle 1.

The surrounding vehicle detection unit 632 detects the surrounding vehicles V11 to V14 and lane lines LL11 to LL13 by inputting the surrounding image P1 to a classifier. In FIG. 4B, the region B1 corresponding to the surrounding vehicle V11 in the surrounding image P1 is illustrated by double lines, and illustration of regions corresponding to other surrounding vehicles will be omitted.

The surrounding vehicle detection unit 632 identifies the width of the lane L11 shown at the position of the base of the region B1 in the surrounding image P1. When at least one of the respective intersections of the lane lines LL11 and LL12 demarcating the lane L11 with the extended line of the base of the region B1 is hidden by an obstacle such as one of the surrounding vehicles in the surrounding image P1, the surrounding vehicle detection unit 632 may identify the width of the lane L11 from the position of an estimated intersection identified as the intersection of a lane line model generated by using visible part of the lane lines LL11, LL12 with the extended line of the base of the region B1. The surrounding vehicle detection unit 632 estimates the distance from the surrounding camera 2 of the vehicle 1 to the position of the base of the region B1 by using the width of the lane L11 included in the map data stored in the storage device 5, the width of the lane L11 shown in the surrounding image P1, and the focal length of the optical system of the surrounding camera 2 stored in the memory 62. The surrounding vehicle detection unit 632 similarly estimates the distances to the other surrounding vehicles.

The determination unit 633 determines whether the respective detected positions of the surrounding vehicles V11 to V14 are included in a predetermined range D from the vehicle 1. The range D is, for example, set to the distance twice as the standard following distance on the road R1 and is stored in the memory 62. The range D may also be set longer as the faster the speed of the vehicle 1.

In the first example of object detection, the determination unit 633 determines that the respective positions of the surrounding vehicles V11, V12 are included in the range D. In this case, the number of the surrounding vehicles detected alongside in the width direction of the vehicle is two, which is not greater than the number of lanes (two).

Figure 5A:
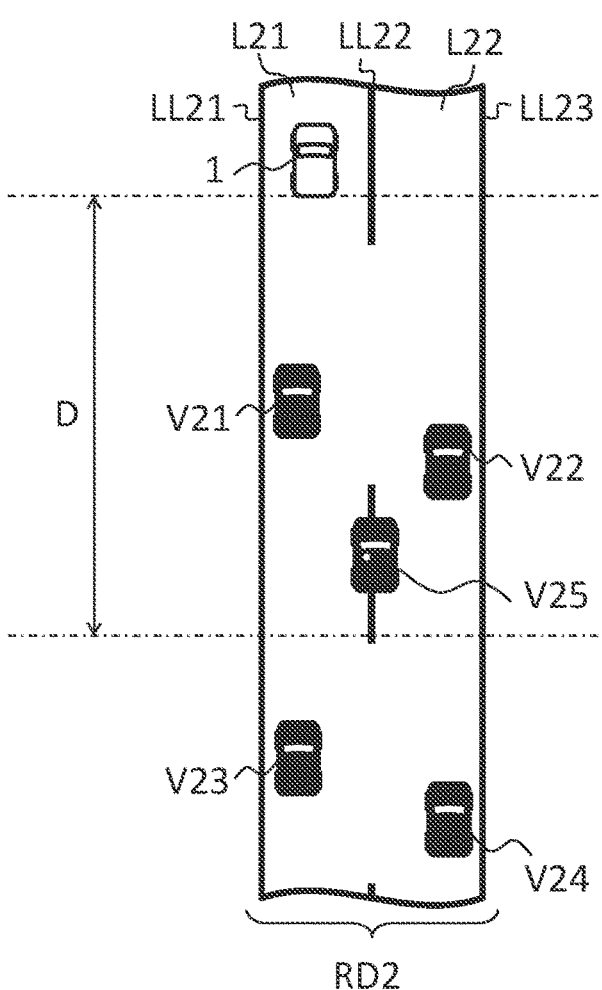
FIG. 5A schematically illustrates a second example of object detection.
Figure 5B:
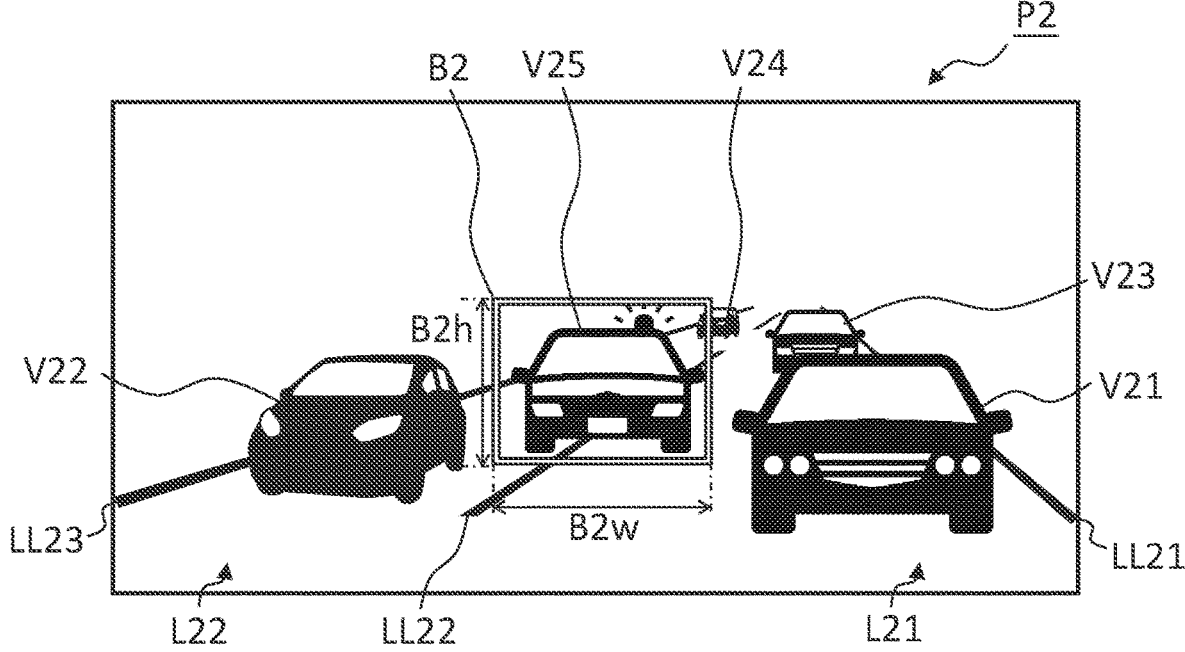
FIG. 5B is a surrounding image generated in accordance with the second example of object detection.

FIG. 5A schematically illustrates a second example of object detection and FIG. 5B shows a surrounding image generated in accordance with the second example of object detection.

The second example of object detection differs from the first example of object detection on the point that a surrounding vehicle V25 is traveling close to a lane line LL22 on the road R2. The rest is similar to the first example of object detection; therefore, explanations of common parts will be omitted. The surrounding vehicle V25 is an emergency vehicle. The position of the surrounding vehicle V25 is included in the range D.

In the second example of object detection, the determination unit 633 determines that the number of the surrounding vehicles detected alongside in the width direction of the vehicle is three, that is, the surrounding vehicles V21, V22, and V25. This is greater than the number of lanes (two). The determination unit 633 determines that a possibility that any one of the surrounding vehicles V21, V22, and V25 in the second example of object detection being an emergency vehicle is higher than the possibility of any one of the surrounding vehicles V11, V12 in the first example of object detection being an emergency vehicle.

The determination unit 633 may also calculate the respective speeds of the surrounding vehicles from the changes in the distances estimate distances to surrounding vehicles in a plurality of surrounding images generated at predetermined time intervals. Vehicles other than the emergency vehicle should be traveling slower than the emergency vehicle since they are required to avoid blocking the path of the emergency vehicle. Therefore, the determination unit 633 may also determine that the possibility that a surrounding vehicle among the surrounding vehicles presumed to include an emergency vehicle being an emergency vehicle is higher as the faster its speed. By determining the possibility of being an emergency vehicle for each of the surrounding vehicles, the ECU 6 can propose a driver of the vehicle 1 to move away from a surrounding vehicle with a high possibility of being an emergency vehicle.

A vehicle other than an emergency vehicle often evacuates to the road shoulder etc. to avoid blocking the path of the emergency vehicle, thereby provides space for the emergency vehicle to travel. In an example shown in FIG. 5A, no other surrounding vehicles are detected in front nor back of the surrounding vehicle V25 detected as the emergency vehicle while other surrounding vehicles V23, V24 are detected in front or back of the other surrounding vehicles V21, V22. Therefore, the determination unit 633 may also determine that the possibility that a surrounding vehicle whose front or back no other surrounding vehicle is detected among the surrounding vehicles judged to highly possibly include one which is an emergency vehicle is higher being an emergency vehicle than the possibility of a surrounding vehicle being an emergency vehicle whose front or back other surrounding vehicles are detected.

Figure 6A:
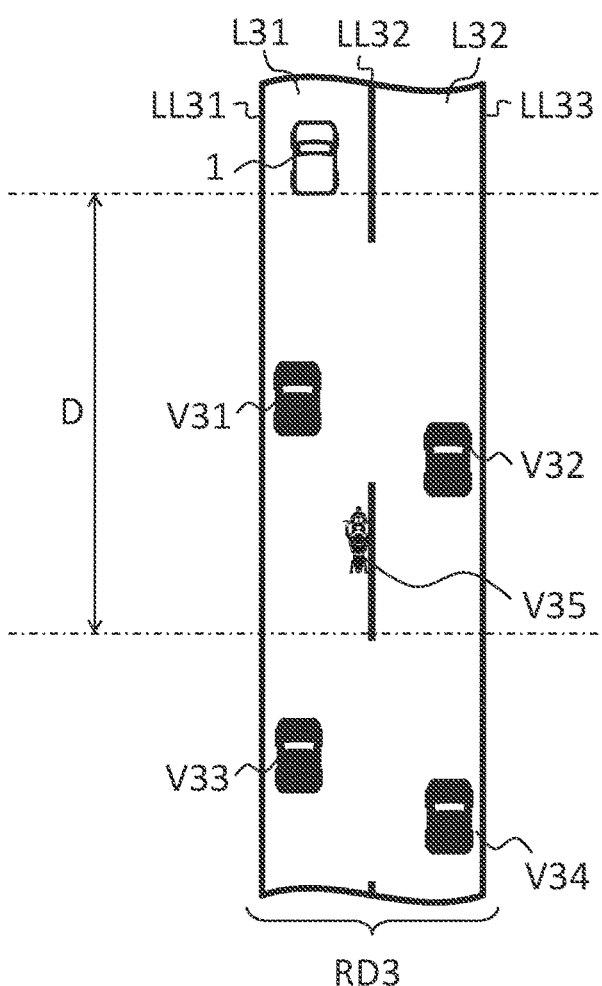
FIG. 6A schematically illustrates a third example of object detection.
Figure 6B:
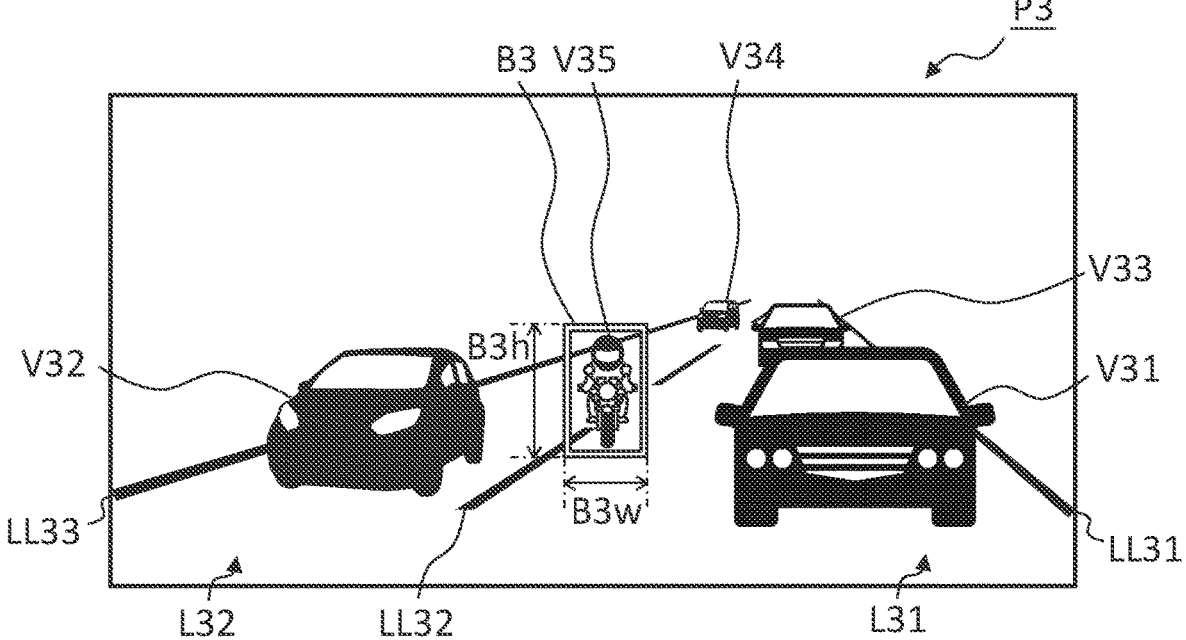
FIG. 6B is a surrounding image generated in accordance with the third example of object detection.

FIG. 6A schematically illustrates a third example of object detection, and FIG. 6B shows a surrounding image generated in accordance with the third example of object detection.

The third example of object detection differs from the first example of object detection on the point that a surrounding vehicle V35 is traveling close to a lane line LL32 on the road R3. The rest is similar to the first example of object detection; therefore, explanations of common parts will be omitted. The surrounding vehicle V35 is a two-wheeled vehicle. The position of the surrounding vehicle V35 is included in the range D.

A two-wheeled vehicle has a narrower vehicle width than a four-wheeled vehicle. Therefore, the width of the road required for the two-wheeled vehicle to travel is also narrower than the width of the road required for a four-wheeled vehicle to travel. A two-wheeled vehicle sometimes happens to travel near the lane line demarcating lanes on which vehicles are traveling at low speeds, typically at the time of congestion. Other vehicles are not required to give way to the two-wheeled vehicle which it is not an emergency vehicle.

In detection of surrounding vehicles, the surrounding vehicle detection unit 632 identifies regions corresponding to surrounding vehicles from a surrounding image. The aspect ratio of the region B2 corresponding to the surrounding vehicle V25 detected from the surrounding image P2 in the second example of object detection indicating the ratio of the length B$2w$ in the left-right direction to the length B$2h$ in the top-bottom direction is represented by B$2w$/B$2h$. The aspect ratio of the region B3 corresponding to the surrounding vehicle V35 detected from the surrounding image P3 in the third example of object detection indicating the ratio of the length B$3w$ in the left-right direction to the length B$3h$ in the top-bottom direction is represented by B$3w$/B$3h$.

Generally, emergency vehicles such as an ambulance, fire truck, or police car are not two-wheeled vehicles, so the aspect ratio threshold value may be set as a value corresponding to the maximum value of the aspect ratio of a general two-wheeled vehicle. Further, the aspect ratio threshold value may be set as a value corresponding to the minimum value of the aspect ratio of a general four-wheeled vehicle or a value between a value corresponding to the maximum value of the aspect ratio of a general two-wheeled vehicle and a value corresponding to the minimum value of the aspect ratio of a general four-wheeled vehicle.

The detection unit 633 detects that the aspect ratio B$2w$/B$2h$ of the region B2 corresponding to the surrounding vehicle V25, which is a four-wheeled vehicle, is larger than the aspect ratio threshold value. Further, the detection unit 633 detects that the aspect ratio B$3w$/B$3h$ of the region B3 corresponding to the surrounding vehicle V35, which is a two-wheeled vehicle, is smaller than the aspect ratio threshold value. The detection unit 633 detects that the possibility of the surrounding vehicle V35 being an emergency vehicle in the third example of object detection lower than the possibility of the surrounding vehicle V25 being an emergency vehicle in the second example. The determination unit 633 may lower the determined possibility of a surrounding vehicle among a plurality of surrounding vehicles being an emergency vehicle when the aspect ratio of the region corresponding to a surrounding vehicle with the fastest speed among a plurality of surrounding vehicles with high possibility of being an emergency vehicle is smaller than an aspect ratio threshold value.

An emergency vehicle emits an emergency sound when traveling to notify the surrounding vehicles of an approach of an emergency vehicle. Therefore, when an emergency vehicle approaches the vehicle 1, it may be supposed that an emergency sound is included in the sound information acquired by a surrounding microphone mounted in the vehicle 1 as a surrounding sensor. The determination unit 633 determines that the possibility of a surrounding vehicle among the surrounding vehicles being an emergency vehicle is higher when an emergency sound is detected from the sound information than when an emergency information is not detected from the sound information.

FIG. 7 is a flowchart of a process for object detection. The ECU 6 repeats the processing shown in FIG. 7 at predetermined intervals (e.g., intervals of 1 second) during travel of the vehicle 1 under autonomous driving control.

First, the lane number detection unit 631 of the processor 63 of the ECU 6 detects the number of lanes included in the road on which the vehicle is traveling (step S1).

Next, the surrounding vehicle detection unit 632 of the processor 63 of the ECU 6 detects one or more surrounding vehicles positioned in surroundings of the vehicle 1 from a surrounding image representing the surroundings of the vehicle 1 generated by a surrounding camera 2 mounted in the vehicle 1 (step S2).

The determination unit 633 of the processor 63 of the ECU 6 determines whether the number of the surrounding vehicles detected alongside in the width direction of the vehicle exceeds the number of lanes detected in a predetermined range at the back of the vehicle (step S3).

When the number of the detected surrounding vehicles is determined to exceed the number of lanes (step S3: Y), the determination unit 633 determines that one of the surrounding vehicles is an emergency vehicle with the first probability (step S4) and terminates the object detection processing.

When the number of the detected surrounding vehicles is determined not exceed the number of lanes (step S3: N), the determination unit 633 determines that one of the surrounding vehicles is an emergency vehicle with a second probability (step S4) and terminates the object detection processing. The second probability is a probability smaller than the first probability. In other words, the determination unit 633 determines, when more surrounding vehicles than the number of lanes are detected alongside, a higher probability of a vehicle being an emergency vehicle than when more surrounding vehicles than the number of lanes are not detected.

The ECU 6 can appropriately detect an emergency vehicle by performing the object detection processing as described above.

The vehicle 1 may also have as a surrounding sensor a LiDAR (light detection and ranging) sensor or radar (radio detection and ranging) sensor. A LiDAR sensor or radar sensor outputs as surrounding data a range image whose pixels each has a value depending on the distances to an object represented in the pixel, based on the surroundings of the vehicle 1.

Note that those skilled in the art can apply various changes, substitutions, and modifications without departing from the spirit and scope of the present disclosure.

What is claimed is:

1. An apparatus for object detection, comprising a processor configured to detect a number of lanes included in a road on which a vehicle is traveling, detect one or more surrounding vehicles positioned in surroundings of the vehicle from a surrounding image representing the surroundings of the vehicle generated by a camera mounted in the vehicle, determine, when more surrounding vehicles than the number of lanes detected in a predetermined range at the back of the vehicle are detected alongside in a width direction of the vehicle, that a possibility that any one of the surrounding vehicles being an emergency vehicle which is allowed to travel without obeying the traveling rule of the road is higher than when more surrounding vehicles than the number of lanes are not detected alongside in a width direction of the vehicle; and automatically control the vehicle based on the determined possibility, the control being executed at predetermined intervals during travel of the vehicle under autonomous driving control and comprising change of autonomous driving level and causing a meter display of the vehicle to display information relating to an emergency vehicle approaching the vehicle in a visible way for the driver in accordance with a signal received from the processor via an in-vehicle network.

2. The apparatus according to claim 1, wherein the processor, in the determination, determines that the possibility that a surrounding vehicle among the surrounding vehicles being an emergency vehicle is higher as the faster its speed.

3. The apparatus according to claim 1, wherein the processor, in the determination, determines that the possibility that a surrounding vehicle among the surrounding vehicles being an emergency vehicle is higher with no other surrounding vehicle detected in front or back thereof than the possibility of a surrounding vehicle with other surrounding vehicles detected in front or back thereof.

4. The apparatus according to claim 1, wherein the processor, in the determination, determines that the possibility that a surrounding vehicle among the surrounding vehicles being an emergency vehicle is lower when an aspect ratio showing a ratio of a length in a left-right direction to a length in an up-down direction in a region corresponding to a surrounding vehicle in the surrounding image is smaller than a predetermined aspect ratio threshold value than when the aspect ratio is larger than the aspect ratio threshold value.

5. The apparatus according to claim 1, wherein the processor, in the determination, determines that the possibility that a surrounding vehicle among the surrounding vehicles being an emergency vehicle is higher when an emergency sound that an emergency vehicle emits while traveling is detected from sound information in the surroundings of the vehicle generated by a microphone mounted at the vehicle than when the emergency sound is not detected from the sound information.

6. A method for object detection, comprising:

detecting a number of lanes included in a road on which a vehicle is traveling, detecting one or more surrounding vehicles positioned in surroundings of the vehicle from a surrounding image representing the surroundings of the vehicle generated by a camera mounted in the vehicle, determining, when more surrounding vehicles than the number of lanes detected in a predetermined range at the back of the vehicle are detected alongside in a width direction of the vehicle, that a possibility that any one of the surrounding vehicles being an emergency vehicle which is allowed to travel without obeying the traveling rule of the road is higher than when more surrounding vehicles than the number of lanes are not detected alongside in a width direction of the vehicle; and automatically controlling the vehicle based on the determined possibility, the controlling being executed at predetermined intervals during travel of the vehicle under autonomous driving control and comprising changing of autonomous driving level and causing a meter display of the vehicle to display information relating to an emergency vehicle approaching the vehicle in a visible way for the driver in accordance with a signal received from the processor via an in-vehicle network.

7. A non-transitory computer readable medium in which is stored a computer program for object detection stored therein, the computer program causing a computer mounted in a vehicle to execute a process comprising:

detecting a number of lanes included in a road on which the vehicle is traveling, detecting one or more surrounding vehicles positioned in surroundings of the vehicle from a surrounding image representing the surroundings of the vehicle generated by a camera mounted in the vehicle, determining, when more surrounding vehicles than the number of lanes detected in a predetermined range at the back of the vehicle are detected alongside in a width direction of the vehicle, that a possibility that any one of the surrounding vehicles being an emergency vehicle which is allowed to travel without obeying the traveling rule of the road is higher than when more surrounding vehicles than the number of lanes are not detected alongside in a width direction of the vehicle; and automatically controlling the vehicle based on the determined possibility, the controlling being executed at predetermined intervals during travel of the vehicle under autonomous driving control and comprising changing of autonomous driving level and causing a meter display of the vehicle to display information relating to an emergency vehicle approaching the vehicle in a visible way for the driver in accordance with a signal received from the processor via an in-vehicle network.

\* \* \* \* \*